(12) United States Patent
Cagan et al.

(10) Patent No.: US 8,066,291 B2
(45) Date of Patent: Nov. 29, 2011

(54) SHOPPING CART

(75) Inventors: Jonathan Cagan, Pittsburgh, PA (US);
Andrew Concilio, McMurray, PA (US);
Leah Hoxie, Newton, MA (US);
Francois Humbert, New York, NY
(US); Eric Kemner, Westmont, NJ (US);
Nayoung Kim, Jeonju-si (KR); **Megan
Langdon, Los Angeles, CA (US); Koo
Ho Shin**, Gibsonia, PA (US)

(73) Assignee: **Phoenix Intangibles Holding
Company**, Greenville, DE (US)

( * ) Notice: Subject to any disclaimer, the term of this patent is extended or adjusted under 35 U.S.C. 154(b) by 566 days.

(21) Appl. No.: 12/126,204

(22) Filed: May 23, 2008

(65) Prior Publication Data

US 2009/0058024 A1    Mar. 5, 2009

Related U.S. Application Data

(60) Provisional application No. 60/939,742, filed on May 23, 2007.

(51) Int. Cl.
*B62D 39/00* (2006.01)
(52) U.S. Cl. .............................. 280/33.991; 280/33.997

(58) Field of Classification Search ............... 280/3.992, 280/33.991, 33.993, 33.996, 33.994, 47.35, 280/640, 639, 79.5, 79.53
See application file for complete search history.

(56) References Cited

U.S. PATENT DOCUMENTS

| 3,706,460 | A | * | 12/1972 | Thomas | 280/33.995 |
|---|---|---|---|---|---|
| 4,487,134 | A | * | 12/1984 | Foote | 280/33.992 |
| 5,046,748 | A | * | 9/1991 | Oat-Judge | 280/47.34 |
| 5,507,507 | A | * | 4/1996 | Davidson | 280/33.991 |
| 5,918,891 | A | * | 7/1999 | Russell | 280/33.991 |
| 6,223,864 | B1 | * | 5/2001 | Phelps et al. | 188/19 |
| 6,471,236 | B1 | * | 10/2002 | Eskridge | 280/648 |
| 6,562,102 | B1 | * | 5/2003 | Kepplinger et al. | 75/445 |
| 6,644,674 | B2 | * | 11/2003 | Simard | 280/33.991 |
| 6,749,204 | B2 | * | 6/2004 | Werner | 280/33.992 |
| 6,932,363 | B2 | * | 8/2005 | D'Angelo | 280/33.991 |
| 7,168,715 | B1 | * | 1/2007 | Friedman | 280/47.35 |
| 7,188,847 | B1 | * | 3/2007 | Friedman et al. | 280/47.35 |
| 7,300,062 | B2 | * | 11/2007 | Otterlee et al. | 280/33.992 |

* cited by examiner

*Primary Examiner* — Hau Phan
(74) *Attorney, Agent, or Firm* — Eckert Seamans Cherin & Mellott, LLC; Stephen A. Bucchianeri, Esquire

(57) ABSTRACT

The invention generally relates to a shopping cart that could have: (i) a slidably movable lower container; (ii) a telescoping container; (iii) dual handles; (iv) a stand having a number of holders and a writing surface formed therein; (v) a wheel having a brake coupled thereto; (vi) a generally A-shaped frame; and/or (vii) a retractable child seat assembly.

10 Claims, 6 Drawing Sheets

SHOPPING CART

CROSS REFERENCE TO RELATED APPLICATION

This patent application claims the benefit of U.S. Provisional Patent Application Ser. No. 60/939,742 filed May 23, 2007, the contents of which is hereby incorporated by reference into this patent application in its entirety as if fully set forth herein.

FIELD OF THE INVENTION

This invention generally relates to a shopping cart. More particularly, the shopping cart could have: (i) a slidably movable lower container; (ii) a telescoping container; (iii) dual handles; (iv) a stand having a number of holders and a writing surface formed therein; (v) a wheel having a brake coupled thereto; (vi) a generally A-shaped frame; and/or (vii) a retractable child seat assembly.

BACKGROUND OF THE INVENTION

Shopping carts are known in the art and generally include a frame, a main container, wheel assemblies and a handle for pushing the cart. The average shopper is buying more fresh produce than in years past, yet many shopping carts remain essentially the same with one main container. The main container typically has a limited size child seat assembly that is used in most cases to transport a child or a shopper's personal belongings. Shoppers without children often place fragile items, such as produce, in the child seat assembly in order to protect the produce from heavier items.

The majority of the produce is placed inside the main container due to the limited size of the child seat assembly. Such placement causes the shopper to risk damage to the produce or to constantly relocate the produce to prevent damage as heavier items are placed in the main container. Also, most grocery stores are designed so the shopper begins shopping in the produce department. While the produce department may make the store look more appealing by stimulating the senses of shoppers, the layout also increases the risk of produce being crushed by heavier items placed in the main container as the shopper moves through the remaining aisles of the grocery store.

The shopping cart is also oftentimes difficult to maneuver throughout the grocery store when many shoppers are in the store as well. The shopping cart is additionally hard to move around the grocery store when the aisles are closely spaced together. The shopping cart is also tricky to steer in various directions due to the dimensions of the main container and the wheel base.

Accordingly, a need exists in the art for shopping carts that have additional containers.

A need also exists in the art for shopping carts that have greater maneuverability.

SUMMARY OF THE INVENTION

An object of the invention is to provide a shopping cart that has additional containers.

Another object of the invention is to provide a shopping cart that has greater maneuverability.

Certain objects of the invention are achieved by providing a shopping cart having a frame. A number of front wheel assemblies and a number of rear wheel assemblies support the frame. A main container is coupled to the frame and a mounting assembly is coupled to the frame. A lower container is slidably coupled to the mounting assembly. The main container includes a base, a front, a rear and side walls. The front, the rear and the side walls are coupled together and extend upward from the base. The lower container is structured to be slidably moved in rearward and/or forward directions.

Other objects of the invention are achieved by providing a shopping cart having a frame. A number of front wheel assemblies and a number of rear wheel assemblies support the frame. A main container is coupled to the frame and a telescoping container is located adjacent to a front of the main container. The main container includes a base, the front, a rear and side walls. The front, the rear and the side walls are coupled together and extend upward from the base. The telescoping container is slidably coupled to an upper end of the side walls and the telescoping container is structured to be slidably moved forward.

Other objects of the invention are achieved by providing a shopping cart having a frame. A number of front wheel assemblies and a number of rear wheel assemblies support the frame. A rear handle is coupled to the frame and a main container is coupled to the frame. A front handle is coupled to the main container. The main container includes a base, a front, a rear and side walls. The front, the rear and the side walls are coupled together and extend upward from the base. The front handle is coupled to the front of the main container.

DETAILED DESCRIPTION OF THE PREFERRED EMBODIMENTS

Figure 1:
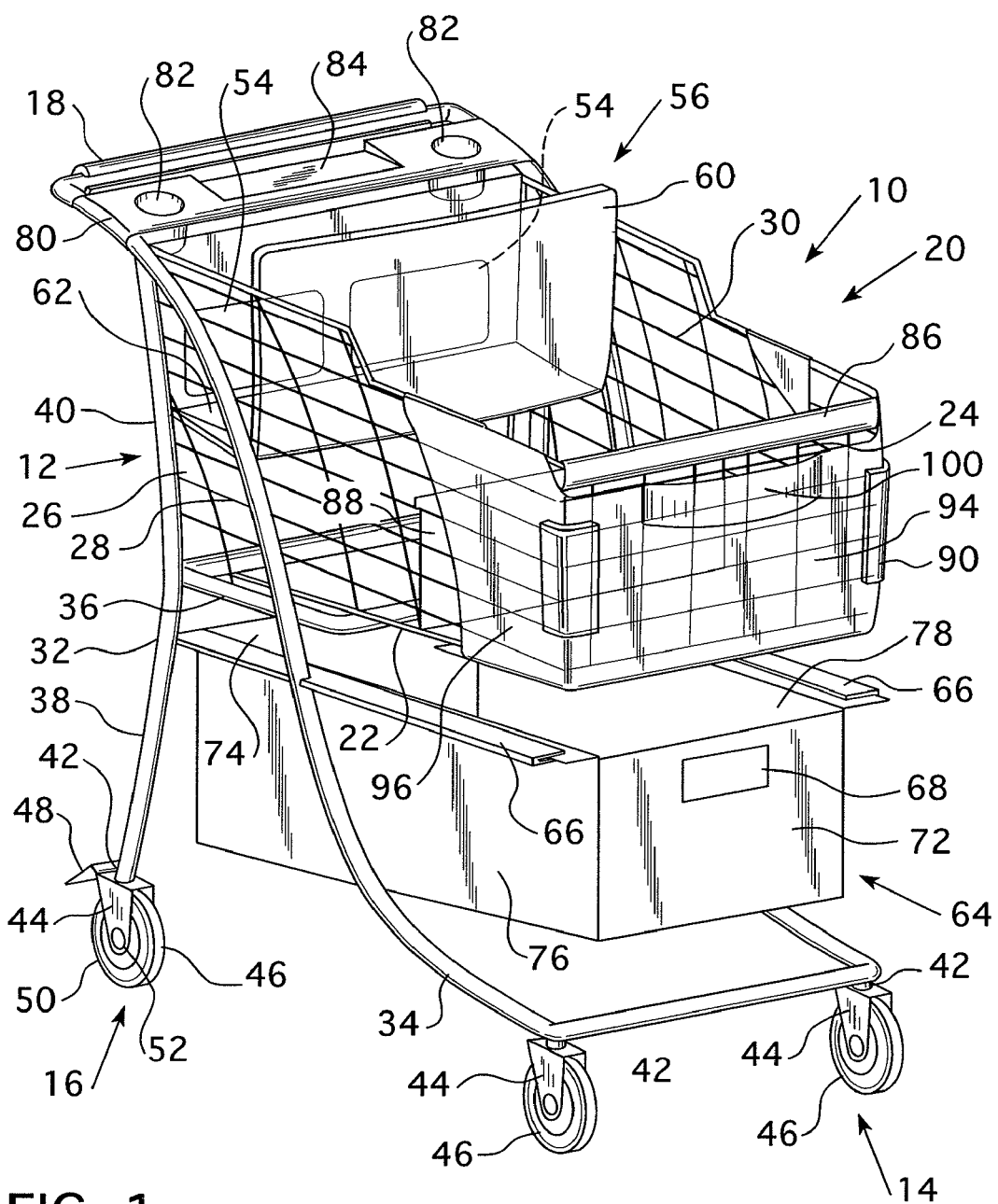
FIG. 1 is an isometric view of a shopping cart of the invention that shows, among other elements, a lower container, a front handle and a telescoping container.

For purposes of the description hereinafter, the terms "upper", "lower", "vertical", "horizontal", "axial", "top", "bottom", "aft", "behind", and derivatives thereof shall relate to the invention as it is oriented in the drawing FIGS. or as it is oriented when resting upright on a flat horizontal surface. However, it is to be understood that the shopping cart may assume various alternative configurations when the invention is moved about or the shopping cart is resting in a non-upright position. It is also to be understood that the specific elements illustrated in the FIGS. and described in the following specification are simply exemplary embodiments of the invention. Therefore, specific dimensions, orientations and other physical characteristics related to the embodiments disclosed herein are not to be considered limiting.

As employed herein, the term "number" shall mean one or an integer greater than one (i.e., a plurality). As employed herein, the statement that two or more parts are "attached", "connected", "coupled", or "engaged" together shall mean that the parts are joined together either directly or joined through one or more intermediate parts.

Turning to FIG. 1, a shopping cart 10 is shown. The shopping cart 10 includes a frame 12, a number of front wheel assemblies 14 and a number of rear wheel assemblies 16 supporting the frame 12, a rear handle 18 coupled to the frame 12, and a main container 20, for holding items (not shown), coupled to the frame 12. The main container 20 includes a base 22, and a spaced apart front 24, rear 26 and opposing side walls 28 and 30, which are coupled together and extend upward from the base 22.

The main container 20 preferably has a reduced length than a main container found in the prior art. A main container 20 with reduced length provides the shopping cart 10 with greater maneuverability. The main container 20 preferably is also wider than the main container found in the prior art. A wider main container 20 provides the shopping cart 10 with greater safety.

The main container 20 is additionally shallower than the main container found in the prior art. A shallower main container 20 provides the shopping cart 10 with easier access.

Figure 2:
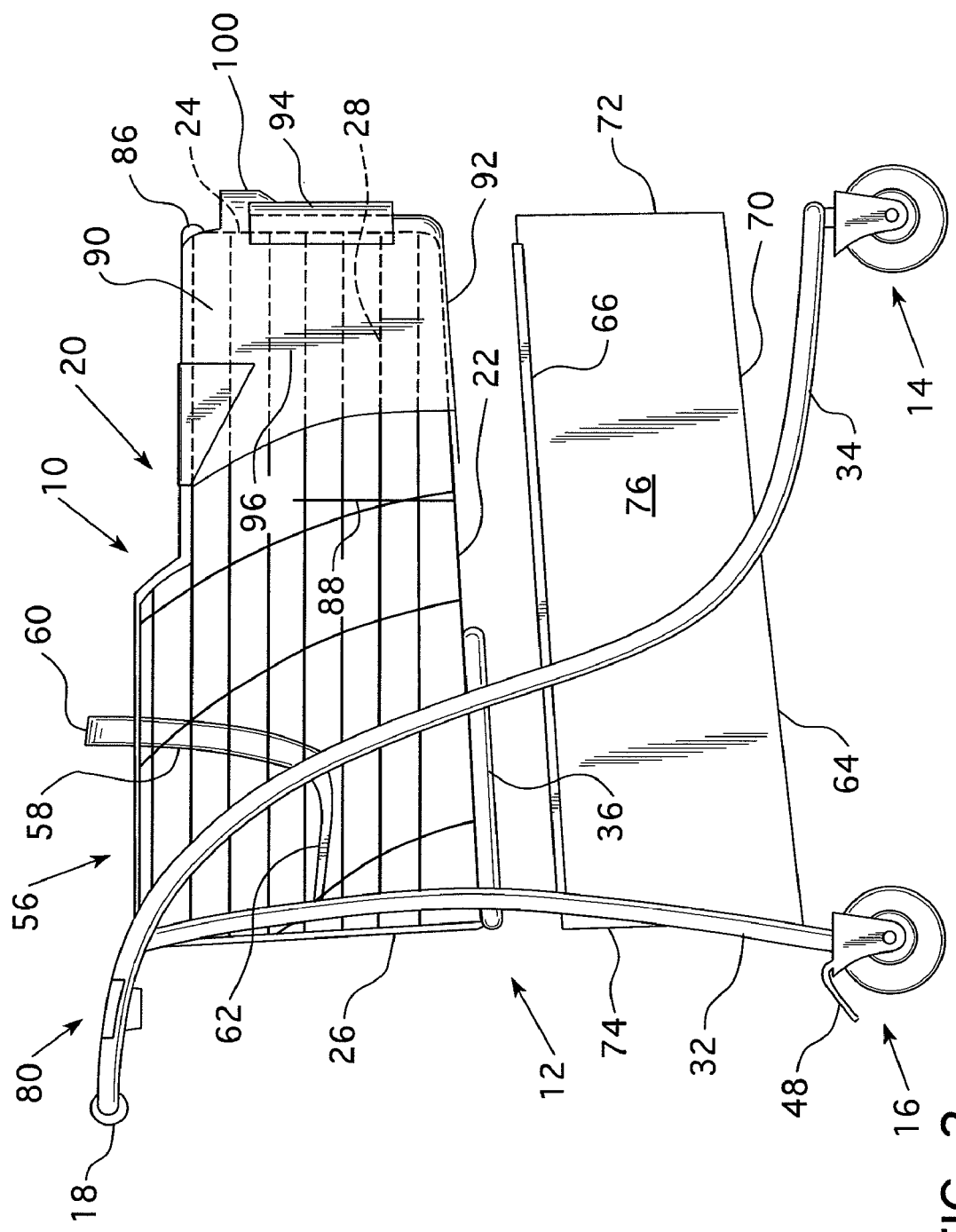
FIG. 2 is a side view of the shopping cart of FIG. 1.

The frame 12 of the shopping cart 10 has the rear handle 18 coupled thereto, a number of upstanding support members 32 and a number of curved support members 34. The curved support members 34 are coupled to the upstanding support members 32. The curved support members 34 provide the shopping cart 10 with an aesthetically appealing appearance. The upstanding support members 32 are coupled to the rear wheel assemblies 16. The curved support members 34 are coupled to the front wheel assemblies 14. The frame 12 also has a bottom support member 36 that is structured to support a portion of the main container 20. In the depicted embodiment, the bottom support member 36 is four-sided in shape, generally lies in a horizontal plane and is coupled to the upstanding support members 32 and the curved support members 34. As shown in FIG. 2, the frame 12 has a generally A-shaped appearance in a side view of the frame 12. The frame 12 comprising the upstanding support members 32, curved support members 34 and bottom support member 36 provide the generally A-shaped appearance in a side view of such elements. The A-shaped appearance provides the shopping cart 10 with an aesthetically appealing appearance.

As shown in FIG. 1, each member of the upstanding support members 32 forms an angle with the bottom support member 36. The upstanding support members 32 are each formed of a tubular member bent into portions including a first portion 38 and an intermediate portion 40. The first portion 38 of each member of the upstanding support members 32 is coupled to one of the rear wheel assemblies 16 at one end and each first portion 38 extends at an angle towards the front 24 of the main container 20 until reaching the bottom support member 36.

After reaching the bottom support member 36, each member of the upstanding support members 32 then bends away from the front 24 of the shopping cart 10 at an angle forming the intermediate portion 40. Each member of the curved support members 34 is bent and may be coupled together. The curved support members 34 provide an upper surface to which the rear handle 18 could be coupled thereto.

As is generally known in the art, the frame 12 is supported by a plurality of wheel assemblies. In general, the shopping cart 10 includes the front wheel assemblies 14 and the rear wheel assemblies 16. The front wheel assemblies 14 and the rear wheel assemblies 16 could include a castor 42, a U-shaped bracket 44, and a wheel 46. At least one of the rear wheel assemblies 16 may be provided with a brake 48 coupled thereto that is structured to stop movement of the rear wheel assemblies 16.

As is known in the art, each U-shaped bracket 44 for a respective castor 42 is adapted to pivot about a generally vertical axis, thereby allowing the castor 42 to swivel. In addition, each U-shaped bracket 44 includes a shaft (not shown) which extends horizontally through the U-shaped bracket 44 defining an axis about which the wheel 46 rotates. The wheels 46 have a wider wheel base than the wheel base of wheels found in the prior art. A wider wheel base provides the shopping cart 10 with greater safety. Each wheel 46 in the rear wheel assemblies 16 includes a rear wheel 50 and a rear shaft 52. The rear shaft 52 extends horizontally through the rear wheel 50 and couples the rear wheel 50 to one of the upstanding support members 32, thereby providing a connection between the rear wheel 50 and the upstanding support members 32 and providing an axis about which the rear wheel 50 can rotate.

The shopping cart 10, as mentioned above, includes a main container 20. The main container 20 can be formed of metal, plastic, or a metal/plastic combination. The main container 20 can be formed from an open latticework structure, an intersecting bar structure, solid sheets of material or combinations thereof. The main container 20 is adapted to be supported by the frame 12 and is coupled to the upstanding support members 32, the curved support members 34 and the bottom support member 36.

In addition, the rear 26 of the main container 20 includes a number of leg apertures 54 associated with a retractable child seat assembly 56 that is coupled to the main container 20. The child seat assembly 56 may be optionally provided with a padded cushion 58 (FIG. 2). The child seat assembly 56 is generally formed from a back portion 60 and a seat portion 62 and may be retractable. The back portion 60 is coupled to the seat portion 62. The seat portion 62 is coupled to approximately the middle of the rear 26 of the main container 20.

Figure 6:
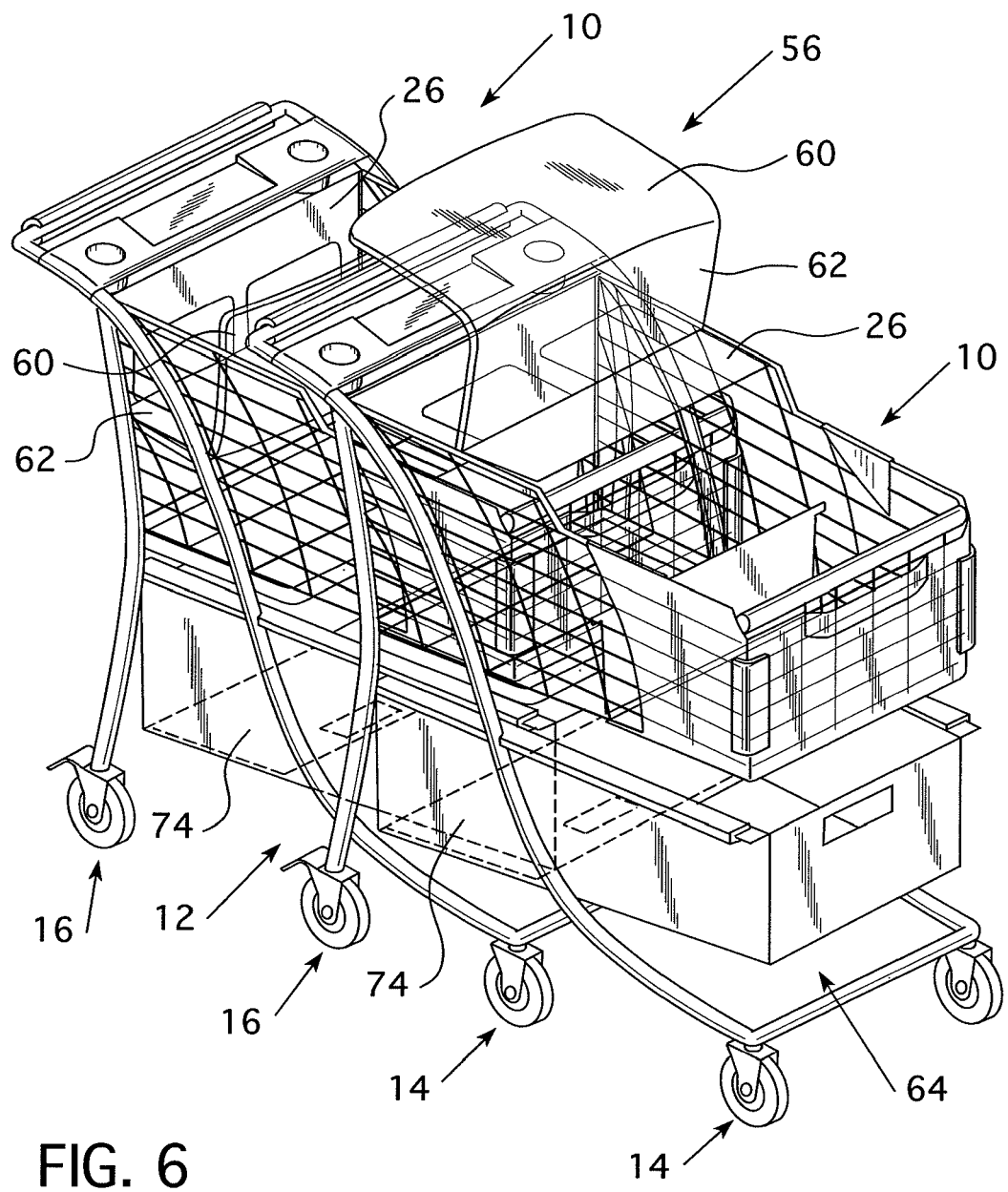
FIG. 6 is an isometric view of two shopping carts of the invention shown nested together.

As shown in FIG. 6, an upper portion of the rear 26 is pivotally attached to the frame 12. Specifically, the upper portion of the rear 26 is pivotally attached to the upstanding support member 32. The pivotal connection allows the retractable child seat assembly 56 to be moved upwardly and out of the main container 20 to allow one shopping cart 10 to nest within another shopping cart 10 as shown in FIG. 6. When the shopping carts 10 are not in use by shoppers, such nesting is advantageous in minimizing the amount of floor space consumed by the shopping carts 10.

Alternatively, the shopping cart 10 could be provided with a retractable shopping cart assembly (not shown) of the type known in the art. Such a retractable child seat assembly is shown and described in U.S. Pat. No. 6,565,102 which is incorporated by reference into this patent application as if fully set forth herein. That retractable child seat assembly is typically formed from a back portion and a seat portion. The back portion is pivotally connected to the base where the base meets the rear. The seat portion is pivotally connected to the back portion and the rear of the main container. The pivotal connection allows the retractable child seat assembly to be stowed when not in use.

In operation, the back portion of the child seat assembly can be pushed away from the rear of the main container, thereby placing the child seat assembly in an open position. When in the open position, the child seat assembly can hold a child or personal items. When not in use, the back portion of the child seat assembly can be pulled towards the rear of the main container, thereby placing the child seat assembly in a stowed position. By placing the child seat assembly in a stowed position, a shopper can free up additional space in the main container. Since the structure and function of such a retractable child seat assembly is generally known in the art, the retractable child seat assembly will not be described in further detail.

The shopping cart 10 has a lower container 64 for holding additional items. The lower container 64 eliminates the use of a lower rack in the shopping cart 10 of the invention. In the prior art, a shopping cart is typically provided with a lower rack. The shopping cart 10 of the invention is safer due to the elimination of the lower rack.

Figure 3:
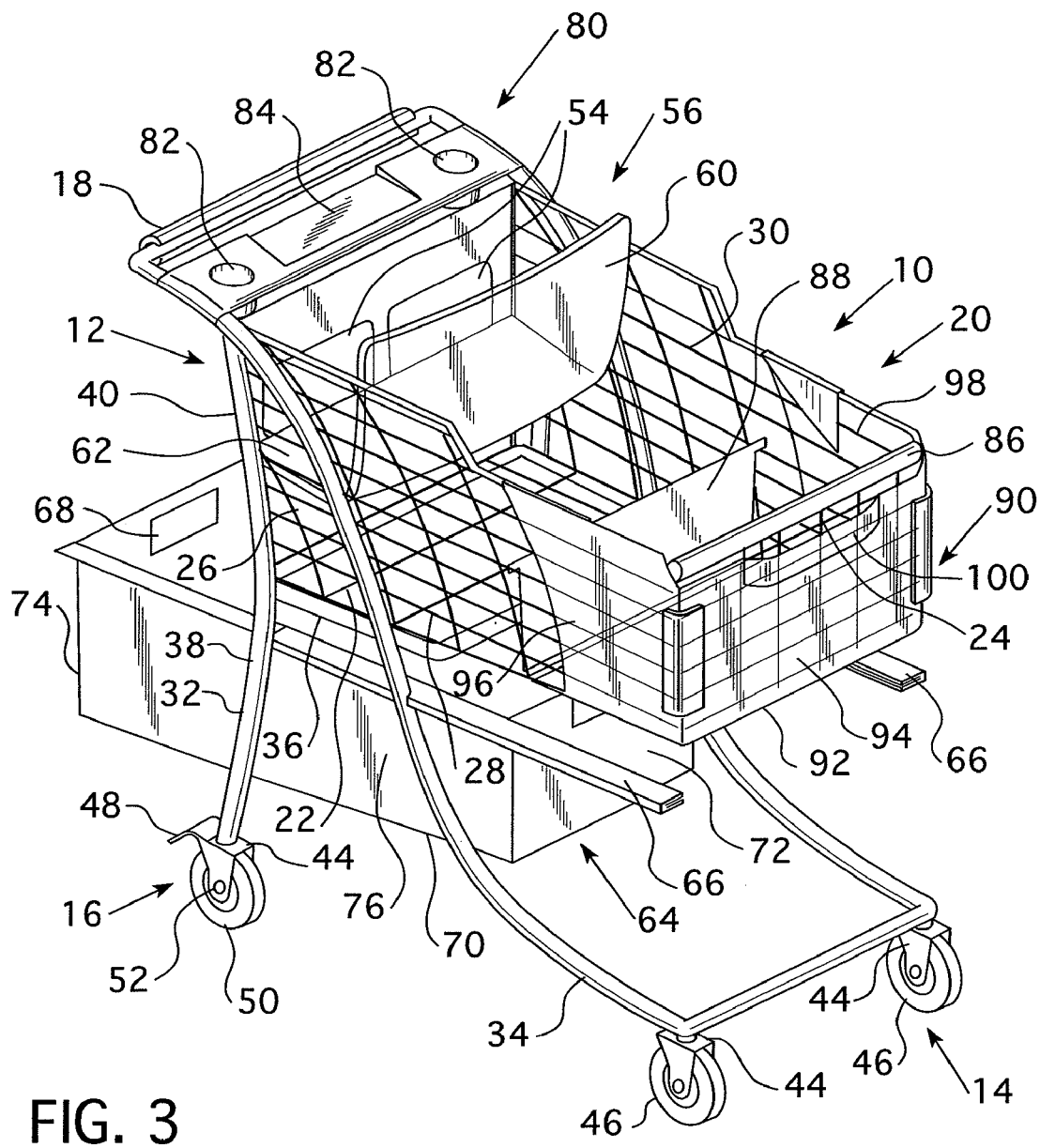
FIG. 3 is an isometric view of the shopping cart of FIG. 1 showing the lower container which has been slidably moved in a rearward direction.
Figure 4:
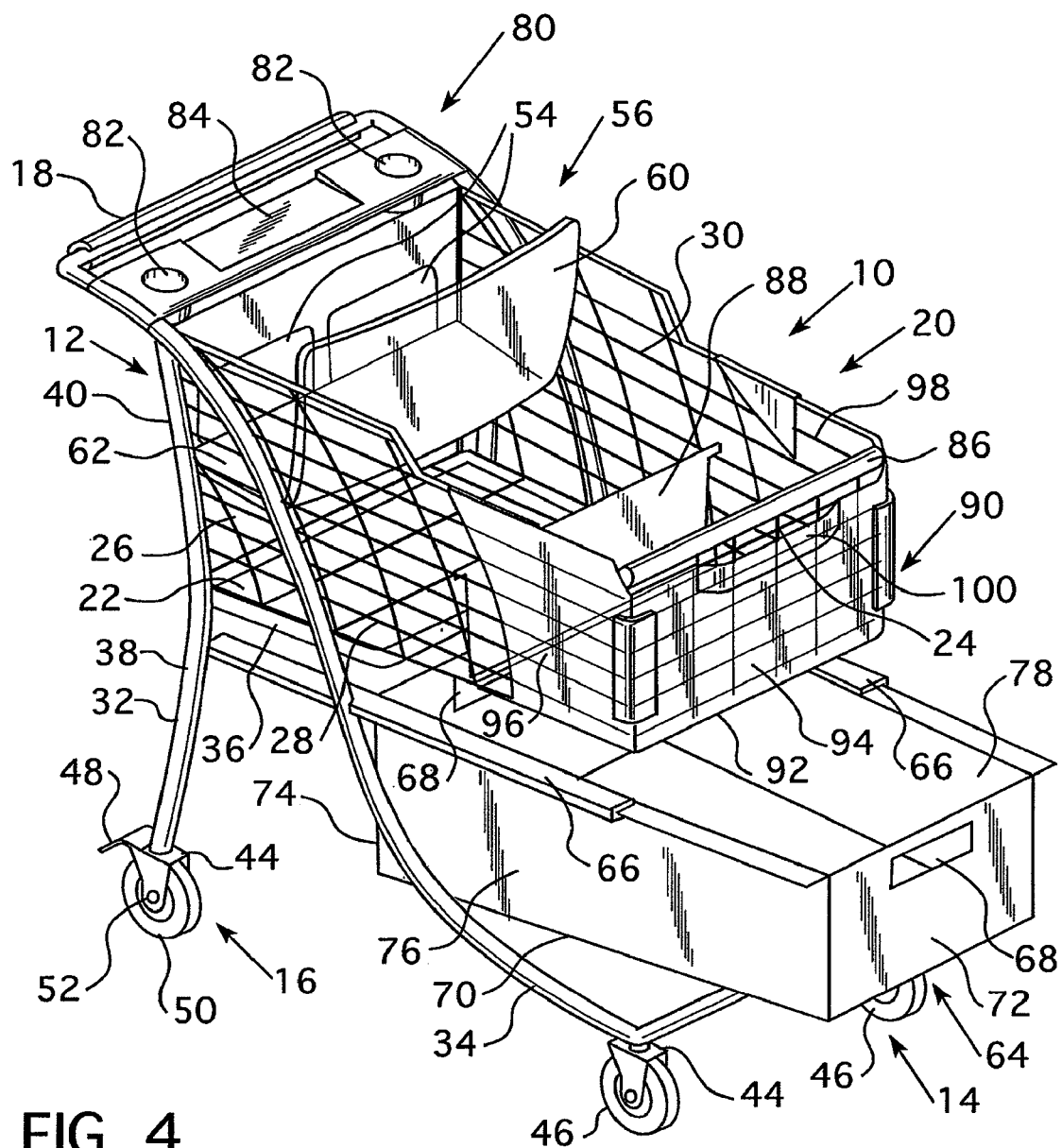
FIG. 4 is an isometric view of the shopping cart of FIG. 1 showing the lower container which has been slidably moved in a forward direction.

The lower container 64 is slidably coupled to a mounting assembly 66. The mounting assembly 66 is located below and adjacent to the main container 20 and the bottom support member 36. The mounting assembly 66 is coupled to the frame 12. The mounting assembly 66 is coupled to the upstanding support members 32 and the curved support members 34. The lower container 64 is located below and adjacent to the main container 20 and the bottom support member 36. As shown in FIGS. 3-4, the lower container 64 is structured to be slidably moved in rearward and forward directions in order for the shopper to advantageously easily access the lower container 64 to place items in the lower container 64. The easy access provided by the slidable movement of the lower container 64 is an ergonomic and convenient improvement over a lower rack used in the prior art. Stops (not shown) may be provided to limit movement of the lower container 64 in only a single direction (i.e., forward or rearward).

The lower container 64 also has a number of notches 68 provided therein in order for the shopper to place his or her fingers in the notches 68 in order to grasp the lower container 64 and move the lower container 64 rearwardly or forwardly. Optionally, the shopper could remove the lower container 64 from the shopping cart 10 if desired.

The lower container 64 includes a base 70, and a spaced apart front 72, rear 74 and opposing side walls 76 and 78, which are coupled together and extend upward from the base 70 to yield a preselected container volume. One of the notches 68 is provided in the front 72 and the other one of the notches 68 is provided in the rear 74. The preselected container volume advantageously provides the shopping cart 10 of the invention with a larger capacity over the prior art lower rack approach. In the invention, the lower container 64 could have a preselected volume whereas the prior art lower rack approach, which lacks any type of side support, does not have a volume. The lower container 64 could be made from a transparent material which would assist in eliminating grocery store losses.

As shown in FIG. 1, a stand 80 may be placed adjacent to the rear handle 18. Optionally, the stand 80 may be an integrally formed component (not shown) of the rear handle 18. In the depicted embodiment, the stand 80 is shown coupled to the frame 12 and the curved support members 34. The stand 80 could be made of metal, plastic, or a metal/plastic combination. A number of holders 82 are formed in the stand 80. The holders 82 are structured for receiving cups, flowers, change, or other items. Optionally, a writing surface 84 is formed in the stand 80. The writing surface 84 is located adjacent to the number of holders 82. The writing surface 84 is optionally in the form of a recess that is located adjacent to the number of holders 82 that provides a convenient surface for the shopper to take notes on a piece of paper (not shown) or to cross off items listed on the piece of paper once the sought after items are deposited in the shopping cart 10.

As shown in FIG. 1, a front handle 86 may be provided in opposed relation to the rear handle 18. The front handle 86 is coupled to an upper end of the front 24 of the main container 20. The front handle 86 provides the shopper with an additional graspable surface to allow for greater maneuverability of the shopping cart 10 around a grocery store.

As shown in FIG. 1, the main container 20 could be provided with a divider 88 for segregating various items that the shopper places in the main container 20. The divider could have a preselected height on the order of about 7 inches to about 8 inches. The divider 88 advantageously allows a shopper to organize the main container 20.

Figure 5:
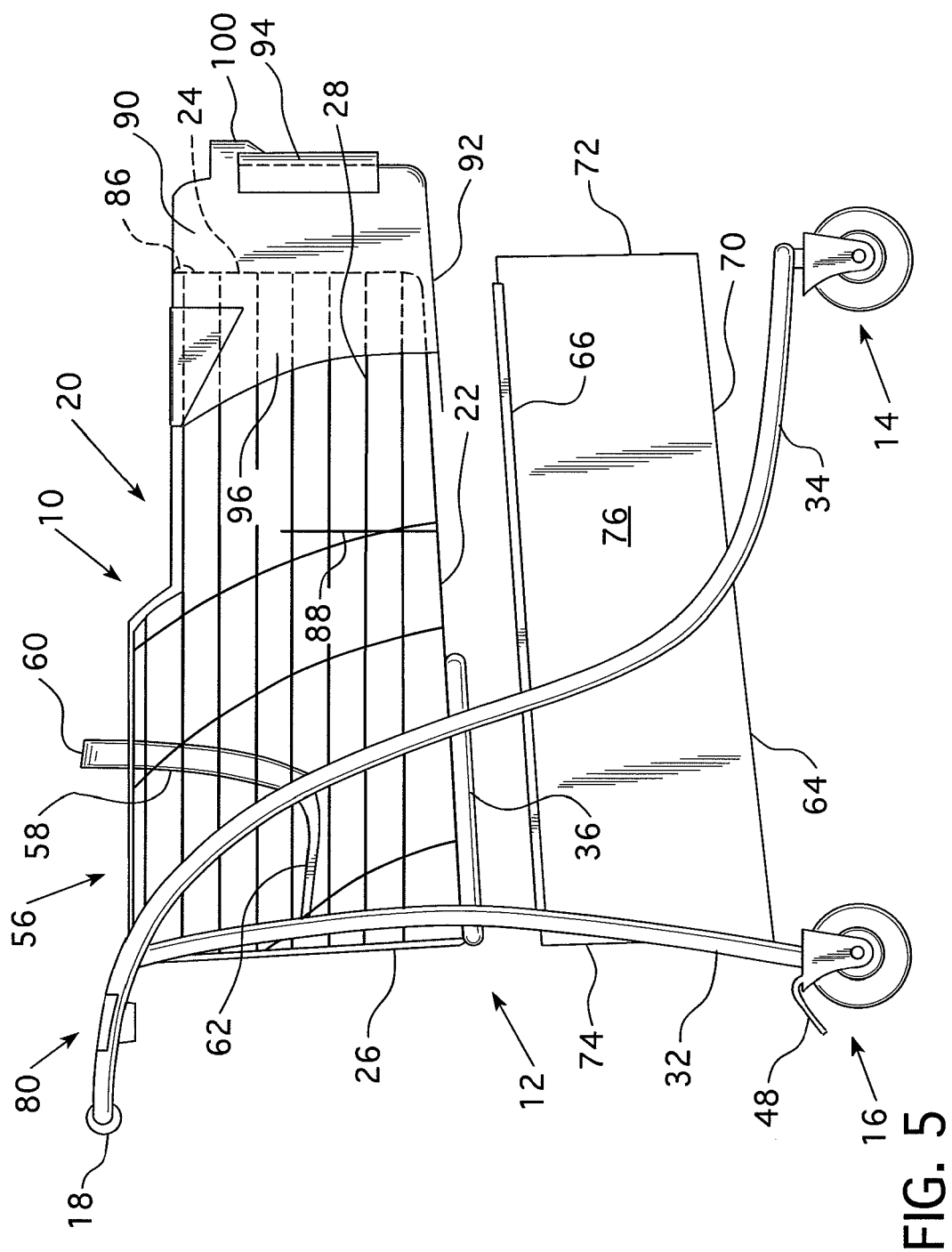
FIG. 5 is a side view of the shopping cart of FIG. 1 showing the telescoping container which has been slidably moved in a forward direction.

A telescoping container 90 could also be located adjacent to the front 24 of the main container 20. The telescoping container 90 is slidably coupled to an upper portion of the side walls 28, 30. The telescoping container 90 surrounds a portion or all of the front 24 and a portion of the side walls 28, 30. As shown in FIG. 5, the telescoping container 90 may be slidably moved in a forward direction in order for the shopper to access the telescoping container 90 to place items in the telescoping container 90. As desired, the telescoping container 90 advantageously increases the overall space of the shopping cart 10 to provide additional room for depositing items. The telescoping container 90 adds additional preselected volume to the main container 20 when the telescoping container 90 is extended whereas a prior art main container does not have such a means for adding additional volume to the prior art main container.

The telescoping container 90 includes a base 92, and a spaced apart front 94 and opposing side walls 96 and 98, which are coupled together and extend upward from the base 92. The front 24 of the main container 20 provides support for a rear of the telescoping container 90 when the telescoping container 90 has been extended in a forward direction and is in use by the shopper. The front 24 of the main container 20 provides that support since the telescoping container 90 does not have an integrally formed rear that is coupled to the base 92 and the side walls 96, 98 of the telescoping container 90. The front 94 of the telescoping container 90 includes a projection 100 that defines a suitably sized recess to allow a shopper to insert a number of fingers therein in order to slidably move the telescoping container 90 in a forward direction.

As shown in FIG. 6, the upper portion of the rear 26 is pivotally attached to the frame 12 as was described above. The pivotal connection allows the retractable child seat assembly 56 to be moved upwardly and out of the main container 20 to allow one shopping cart 10 to nest within another shopping cart 10. Also, the rear 74 of the lower container 64 is pivotally attached to the base 70 and the side walls 76, 78 of the lower container 64. The pivotal connection allows the rear 74 to be folded downward in a collapsed position within the lower container 64 in order to allow one lower container 64 to nest within another lower container 64. When the shopping carts 10 are not in use by shoppers, such nesting is advantageous in minimizing the amount of floor space consumed by the shopping carts 10.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended hereto and any and all equivalents thereto.

What is claimed is:
1. A shopping cart comprising:
a frame having a mounting assembly coupled thereto;

a number of front wheel assemblies and a number of rear wheel assemblies that support the frame;
a main container coupled to the frame;
a telescoping container located adjacent to a front of the main container; and
a lower container slidably coupled to the mounting assembly,
wherein the main container includes a base, the front, a rear and side walls,
wherein the front, the rear and the side walls are coupled together and extend upward from the base,
wherein the telescoping container is slidably coupled to an upper end of the side walls,
wherein the telescoping container is structured to be slidably moved forward, and
wherein the lower container is structured to be slidably moved in at least one of a rearward or forward direction.

2. The shopping cart of claim 1 wherein the frame has a rear handle coupled to the frame,
wherein the main container has a front handle coupled thereto, and
wherein the front handle is coupled to the front of the main container.

3. The shopping cart of claim 1 wherein the frame has a stand coupled thereto,
wherein a number of holders are formed in the stand,
wherein a writing surface is formed in the stand, and
wherein the writing surface is located adjacent to the number of holders.

4. The shopping cart of claim 1 wherein at least one of the rear wheel assemblies has a brake coupled thereto that is structured to stop movement of the at least one of the rear wheel assemblies.

5. The shopping cart of claim 1 wherein the frame has a generally A-shaped appearance in a side view of the frame.

6. The shopping cart of claim 1 wherein the main container includes a retractable child seat assembly.

7. A shopping cart comprising:
a frame comprising a number of upstanding support members and a number of curved support members;
a number of front wheel assemblies coupled to the number of curved support members and a number of rear wheel assemblies coupled to the upstanding support members;
a rear handle coupled to the frame;
a main container fixedly coupled to the frame; and
a front handle coupled to the main container,
wherein the main container includes a base, a front, a rear and side walls,
wherein the front, the rear and the side walls are coupled together and extend upward from the base,
wherein the number of upstanding support members and the number of curved support members provide a generally A-shaped appearance in a side view of the frame,
wherein the frame has a mounting assembly coupled thereto,
wherein a lower container is slidably coupled to the mounting assembly, and
wherein the lower container is structured to be slidably moved in at least one of a rearward or forward direction.

8. A shopping cart comprising:
a frame comprising a number of upstanding support members and a number of curved support members;
a number of front wheel assemblies coupled to the number of curved support members and a number of rear wheel assemblies coupled to the upstanding support members;
a rear handle coupled to the frame;
a main container fixedly coupled to the frame; and
a front handle coupled to the main container,
wherein the main container includes a base, a front, a rear and side walls,
wherein the front, the rear and the side walls are coupled together and extend upward from the base,
wherein the number of upstanding support members and the number of curved support members provide a generally A-shaped appearance in a side view of the frame,
wherein the main container has a telescoping container located adjacent to the front of the main container,
wherein the telescoping container is slidably coupled to an upper end of the side walls, and
wherein the telescoping container is structured to be slidably moved forward.

9. A shopping cart comprising:
a frame comprising a number of upstanding support members and a number of curved support members;
a number of front wheel assemblies coupled to the number of curved support members and a number of rear wheel assemblies coupled to the upstanding support members;
a rear handle coupled to the frame;
a main container fixedly coupled to the frame; and
a front handle coupled to the main container,
wherein the main container includes a base, a front, a rear and side walls,
wherein the front, the rear and the side walls are coupled together and extend upward from the base, and
wherein the number of upstanding support members and the number of curved support members provide a generally A-shaped appearance in a side view of the frame,
wherein the frame has a stand coupled thereto,
wherein a number of holders are formed in the stand,
wherein a writing surface is formed in the stand, and
wherein the writing surface is located adjacent to the number of holders.

10. A shopping cart comprising:
a frame comprising a number of upstanding support members and a number of curved support members;
a number of front wheel assemblies coupled to the number of curved support members and a number of rear wheel assemblies coupled to the upstanding support members;
a rear handle coupled to the frame;
a main container fixedly coupled to the frame; and
a front handle coupled to the main container,
wherein the main container includes a base, a front, a rear and side walls,
wherein the front, the rear and the side walls are coupled together and extend upward from the base, and
wherein the number of upstanding support members and the number of curved support members provide a generally A-shaped appearance in a side view of the frame,
wherein at least one of the rear wheel assemblies has a brake coupled thereto that is structured to stop movement of the at least one of the rear wheel assemblies.

* * * * *